United States Patent
Xie

(10) Patent No.: US 8,056,824 B2
(45) Date of Patent: Nov. 15, 2011

(54) SUCCESSIVE TYPE CONSTANT-TEMPERATURE VALVE CORE WITH SINGLE HANDLE

(75) Inventor: Qingjun Xie, Zhuhai (CN)

(73) Assignee: Suprema (Zhuhai J/V) Thermostatic Sanitaryware Co., Ltd., HongWan Industrial Zone Xiangzhou, Zhuhai (CN)

( * ) Notice: Subject to any disclaimer, the term of this patent is extended or adjusted under 35 U.S.C. 154(b) by 487 days.

(21) Appl. No.: 12/379,264

(22) Filed: Feb. 18, 2009

(65) Prior Publication Data

US 2010/0163636 A1 Jul. 1, 2010

(30) Foreign Application Priority Data

Dec. 25, 2008 (CN) .......................... 2008 1 0220341

(51) Int. Cl.
*G05D 23/13* (2006.01)
(52) U.S. Cl. ................... 236/12.11; 236/12.17; 236/12.2
(58) Field of Classification Search ................ 236/12.1, 236/12.11, 12.17, 12.18, 12.2; 137/468
See application file for complete search history.

(56) References Cited

U.S. PATENT DOCUMENTS

| | | | | |
|---|---|---|---|---|
| 6,935,568 B2 * | 8/2005 | Mace et al. | ................... | 236/12.2 |
| 7,673,808 B2 * | 3/2010 | Mace et al. | ................... | 236/12.2 |
| 2008/0093470 A1 * | 4/2008 | Qingjun | ..................... | 236/12.16 |

FOREIGN PATENT DOCUMENTS

| | | |
|---|---|---|
| CN | 2665478 Y | 12/2004 |
| CN | 2874157 Y | 2/2007 |

* cited by examiner

*Primary Examiner* — Marc Norman
(74) *Attorney, Agent, or Firm* — Lau & Associates, LLC.

(57) ABSTRACT

A successive type constant temperature valve core with single handle comprises a valve cover, a temperature adjusting assembly, a thermo sensitive element and a control assembly for hot and cold inlet water, combining in the chamber of the valve cover from top to bottom, wherein, the control assembly for hot and cold water inlet comprises a holder of the thermo sensitive element, an adjuster, a put-off spring, a buffer spring and a holding piece. The upper part of the holder of the thermo sensitive element props the thermo sensitive element, and the lower part extends from the lower end of the valve cover; the buffer spring is arranged outside the holder of the thermo sensitive element, and the two ends respectively prop the holder of the thermo sensitive element and the adjuster; the adjuster is axial adjustably restricted to the periphery of the lower part of the holder of the thermo sensitive element by matching the buffer spring with the holding piece; the put-off spring is arranged outside the buffer spring, and the two ends are respectively prop the holder of the thermo sensitive element and the valve cover; the top and foot of the adjuster respectively forms cold water inlet and hot water inlet; water outlet is arranged on the wall of the valve cover; the holder of the thermo sensitive element is provided with a mixed water passage that communicates with the cold water inlet, the hot water inlet and the water outlet.

14 Claims, 2 Drawing Sheets

SUCCESSIVE TYPE CONSTANT-TEMPERATURE VALVE CORE WITH SINGLE HANDLE

FIELD OF THE INVENTION

The invention relates to a technical field of plumbing, in particular to a constant-temperature valve core with single handle.

BACKGROUND OF THE INVENTION

The traditional valve core with single handle does not own the function of constant temperature, and the single handle generally is taken as flow control or flow switch. Under the condition of variable temperature and pressure of supply water, the outlet water may be sometimes hot and sometimes cold, which will bring inconvenience to people.

With the advancement of science and technology and the improvement of living standard, the function of constant temperature will be gradually used in the traditional valve core. The valve cores with the function of constant temperature have been widely used in each kind of water supply system for bath in household and hotel, etc. The users can adjust the temperature of outlet water according to actual demands by themselves, and after presetting temperature, the mixed outlet water temperature will be constant; consequently, the problem of sometimes hot and sometimes cold water caused by change of inlet water pressure and unstable temperature by a common valve core can be solved, and the valve core is safe and prevent user's scald.

The utility model with authorized publication patent number of CN2665478 Y discloses a constant-temperature ceramic valve core with single handle, which contains a valve handle, a body of the valve core, a valve cover, a seal ring, a fixed ceramic chip, a movable ceramic chip, an adjuster and a temperature sensor; wherein, the body of the valve core is provided with a cold water inlet, a hot water inlet and a mixed water outlet chamber; the temperature sensor is arranged in the mixed water outlet chamber; the adjuster is connected with the top of the temperature sensor; the lower end of the temperature sensor is provided with a put-off spring. Turning the valve handle up and down to control the movable ceramic chip, so as to switch on and off or regulate the water; turning the valve handle left and right can regulate the proportion of cold and hot water; consequently, the temperature of the mixed outlet water can always be kept at the presetting water temperature. The patent technology has more complicated internal structure and unstable quality; consequently, the inner water passage can be restricted on a certain extent, and small-size valve core is difficult to be made, as small volume valve core has the defect of deficient flow rate.

Besides, the users only use the function of flow switch and pay less attention to the adjustment of flow rate in the actual application.

SUMMARY OF THE INVENTION

The invention provides a successive type constant temperature valve core with single handle, which can realize the function of constant temperature. At the same time, the invention has the advantages of small size, simple structure and convenient operation.

The objectives are achieved by applying following technical solution:

A successive type constant-temperature valve core with single handle comprises a valve cover, a temperature adjusting assembly, a thermo sensitive element and a control assembly for hot and cold inlet water, combining in the chamber of the valve cover from top to bottom, wherein the control assembly for hot and cold water inlet comprises a holder of the thermo sensitive element, an adjuster, a put-off spring, a buffer spring and a holding piece, the upper part of the holder of the thermo sensitive element props the thermo sensitive element, and the lower part extends from the lower end of the valve cover; the buffer spring is arranged outside the holder of the thermo sensitive element, and the two ends respectively prop the holder of the thermo sensitive element and the adjuster; the adjuster is axial adjustably restricted to the periphery of the lower part of the holder of the thermo sensitive element by matching the buffer spring with the holding piece; the put-off spring is arranged outside the buffer spring, and the two ends are respectively prop the holder of the thermo sensitive element and the valve cover; the top and foot of the adjuster respectively forms cold water inlet and hot water inlet; water outlet is arranged on the wall of the valve cover; the holder of the thermo sensitive element is provided with a mixed water passage that communicates with the cold water inlet, the hot water inlet and the water outlet.

In order to further provide the function of the flow switch, based on the above-mentioned technical solution, a flow switch is arranged in the water outlet; a sealing member is arranged on the foot of the temperature adjusting assembly, which can switch off the water outlet by sealing and matching with the flow switch.

The outlet water temperature that is to be controlled by the thermo sensitive element will be preset by operating the temperature adjusting assembly in the invention. When the inlet water temperature or pressure changes, the thermo sensitive element will cooperate with the put-off spring to drive the adjuster to float up and down and to regulate the proportion of cold and hot water; consequently, the outlet water temperature can be controlled constant. Besides, by applying the mode of arranging the put-off spring on the buffer spring, the invention has more compact structure and the application is more convenient and reliable. In addition, by arranging the flow switch in the water outlet and the sealing member at the foot of the temperature adjusting assembly, the temperature adjusting assembly integrates a function of flow switch based on the function of temperature adjusting, which is to say, realizing the function of temperature adjusting and flow switch through a single operation end (single handle).

DESCRIPTION OF EMBODIMENTS

Figure 1:
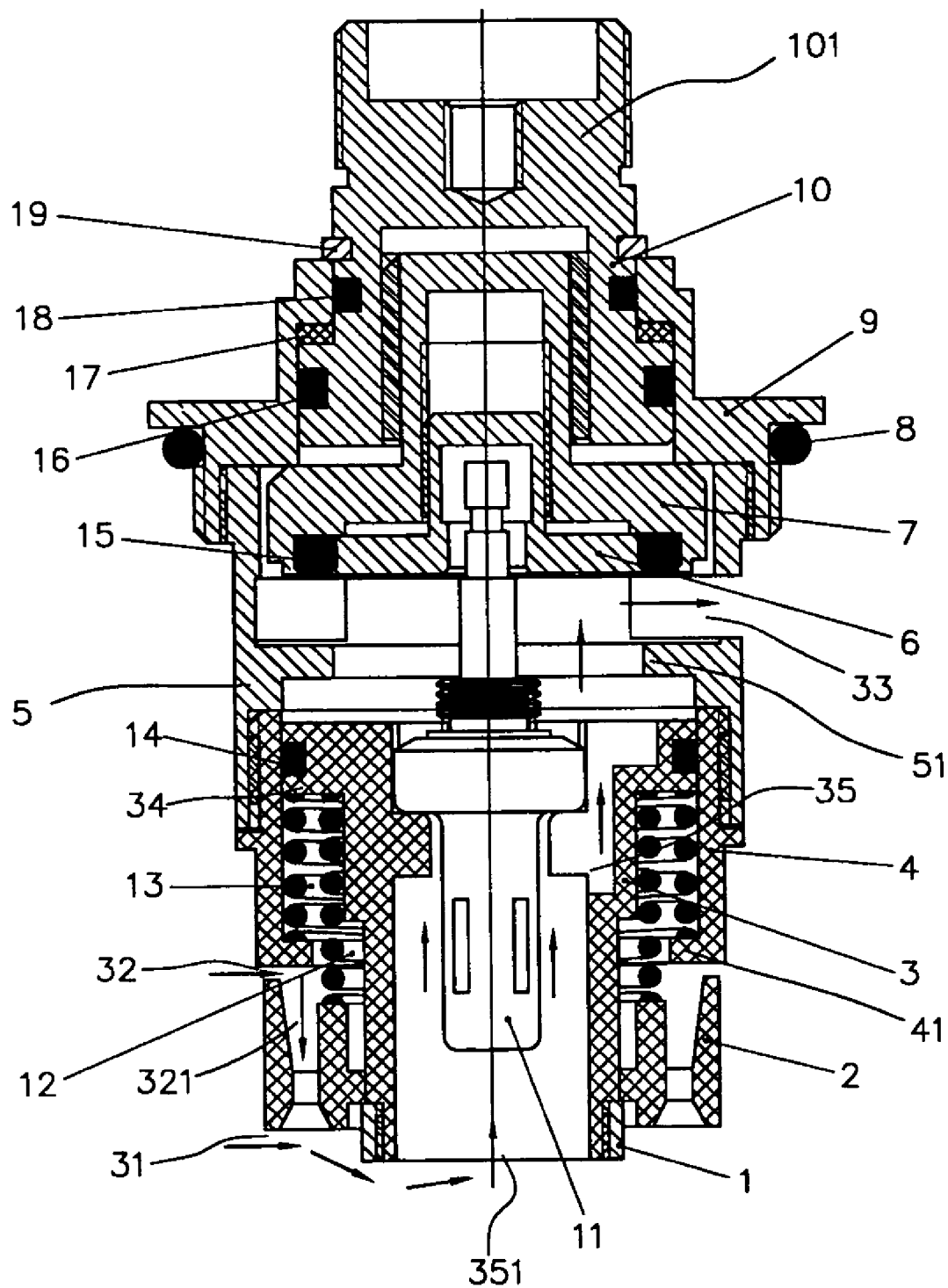
FIG. 1 is a section view of one complementation mode of the invention, successive type constant-temperature valve core.

The successive type constant-temperature valve core provided by the embodiment comprises a valve cover, a temperature adjusting assembly, a thermo sensitive element and a control assembly of cold and hot water. Wherein, the temperature adjusting assembly matches with the upper part of the thermo sensitive element, and the lower part of the thermo sensitive element matches with the control assembly of cold and hot water, which are arranged in the chamber of the valve cover from top to bottom. As shown in the FIG. 1, the valve cover comprises a temperature adjusting valve cover 9, a water outlet valve cover 5 and a spring pocket 4, all of which are arranged from top to bottom; wherein, an chamber come into being in the internal part of the valve cover, and certainly the valve cover may be processed and formed into an integral. The temperature adjusting assembly comprises a temperature adjusting valve handle 10 and a link gear of the valve handle; the link gear of the valve handle comprises a tip seat 7 and a tip 6. The whole temperature adjusting assembly is used for matching with the thermo sensitive element and regulating the heat sensitivity of the thermo sensitive element, so as to set the temperature of the outlet water; the control assembly of the cold and hot water inlets comprises a thermo sensitive element holder 3, a buffer spring 12, a put-off spring 13, an adjuster 2 and a gland nut 1. Besides the main elements, the successive type constant-temperature valve core provided by the embodiment also comprises a lubricated gasket 17, a limit ring 19 and seal rings 8, 14, 15, 16, 18.

As shown in the FIG. 1, the temperature adjusting valve cover 9 runs through up and down, the principal part of the temperature adjusting assembly is arranged in the temperature adjusting valve cover 9; the upper part 101 of the temperature adjusting valve handle 10 protrudes from the top of the temperature adjusting valve cover 9; the tip seat 7 is matched with the temperature adjusting valve handle 10 with trapezoid thread; a tip 6 is arranged below the tip seat 7; the tip seat 7 and the tip 6 can be reciprocating up and down driven by the temperature adjusting valve handle 10; the lower end of the tip 6 props and matches with the thimble of the thermo sensitive element 11. The limit ring 19 is arranged in the limit ring groove, which is cut on the temperature adjusting valve handle 19, and clings on the top of the temperature adjusting valve cover 20; the lubricated gasket 17 is arranged between the inner wall of the temperature adjusting valve cover 9 and the external wall of the temperature adjusting valve handle 10; the seal rings 16 and 18 are arranged between the inner wall of the temperature adjusting valve cover 9 and the external wall of the temperature adjusting valve handle 10; the seal ring 8 is arranged on the external part of the temperature adjusting valve cover 9.

A water outlet 33 is arranged on the wall below the tip 6 of the water outlet valve cover 5; the flow switch 51 is arranged at the place of the water outlet 33; a seal ring 15 is arranged at the bottom of the link gear of the valve handle that formed by the tip seat 7 and the tip 6, which can downward closely match with the flow switch to switch off the water outlet 33.

The temperature sensing probe of the thermo sensitive element 11 is arranged in the passage of the thermo sensitive element holder; the upper part of the thermo sensitive element holder 3 matches with the thermo sensitive element 11; the upper part of the thermo sensitive element holder 3 is equipped with a spring actuation part 34; the outer edge of the spring actuation part 34 can match with the spring cover 4 by relatively sliding; a seal ring 14 is arranged between them; the lower part of the thermo sensitive element holder protrudes from the lower part of the valve cover (namely the lower part of the spring cover 4); the buffer spring 12 is arranged in the periphery of the thermo sensitive element holder 3; one end of the buffer spring 12 props and matches with the spring actuation part 34 of the thermo sensitive element holder 3, and the other end downward props the adjuster 2 and matches the gland nut 1 to axially and adjustably restrict the adjuster 2 in the periphery of the lower part of the thermo sensitive element holder 3; the put-off spring 13 is arranged in the periphery of the buffer spring 12; the foot of the spring cover 4 is equipped with a supporting part of the put-off spring 41; one end of the put-off spring 13 matches with the spring actuation part 34, and the other end matches with the supporting part of the put-offspring 41.

The top of the adjuster 2 matches with the lower end of the valve cover (namely the lower end of the spring cover 4) forms the cold water inlet 32; the hot water inlet 31 is arranged in below the lower end of the adjuster 2, and when the valve core in the embodiment is arranged in a water tap, the lower end of the adjuster 2 will form the hot water inlet 31 with the chamber wall of the water tap; the thermo sensitive element holder 3 is equipped with a mixed water passage 35, and the mixed water passage 35 will communicate with the cold water inlet 32, the hot water inlet 31 and the water outlet 33. In the embodiment, the foot of the thermo sensitive element holder 3 is equipped with a mixed water inlet 351; a cold water passage 321 is lengthways arranged on the adjuster 2; the lower end of the cold water passage 321 is communicated with the hot water inlet 31 and the mixed water inlet 351. As the cold water passage is lengthways arranged, cold water can enter into the mixed water passage of the thermo sensitive element holder through a rather flexuous passage (including two 90 degree angles); the test result shows the rather flexuous water inlet passage can stabilize the inlet water pressure and play the effect of constant pressure.

Figure 2:
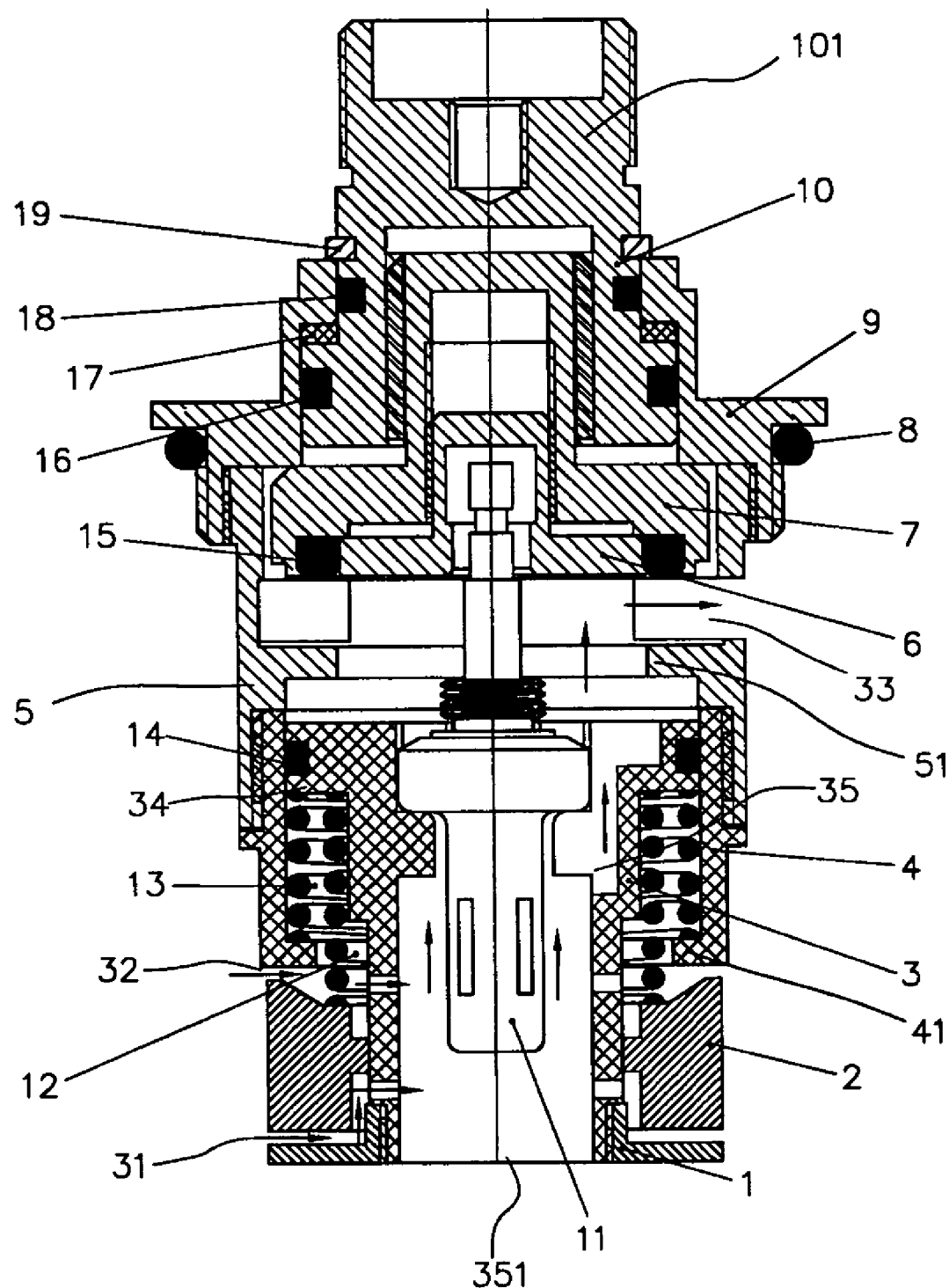
FIG. 2 is a section view of another complementation mode of the invention, successive type constant-temperature valve core.

Certainly, the mode of arranging mating holes of hot and cold water respectively on the corresponding position of the side wall of the thermo sensitive element holder 3 is not excluded. As shown in the FIG. 2, it is another implementation mode of the successive type constant-temperature valve core with single handle. The top of the adjuster 2 matches with the lower end of the valve cover (namely the lower end of the spring cover 4) and forms the cold water inlet 32; the lower end of the adjuster 2 matches with the holding piece 1 forms the hot water inlet 31; the mating holes of hot and cold water that correspond the cold water inlet 32 and the hot water inlet 31 are respectively provided on the corresponding position of the side wall of the thermo sensitive element holder 3.

The working procedure of the successive type constant-temperature valve core with single handle provided by the embodiment is as follows: cold and hot water are respectively input from a cold water inlet 32 and a hot water inlet 31, and directly flow into the internal part of the valve core through the mixed water inlet 351 that is at the bottom of the valve core, fully mix through the mixed water passage 35, flow across the temperature sensing probe of the thermo sensitive element 11, and then flow out from the outlet 33 on the waist of the valve cover (namely, the water outlet valve cover 5). Meanwhile, the water outlet temperature is real-time controlled by the thermo sensitive element 11; when the supply water temperature or pressure changes, the thermo sensitive element 11 will cooperate with the put-off spring 13 to drive the adjuster 2 to move up and down, so as to change the proportion of cold and hot inlet water, and keep the outlet water temperature constant.

The principle of water adjusting of the successive type constant-temperature valve core with single handle provided by the embodiment is as follows: turn the temperature adjusting valve handle 10 leftward and rightward; the temperature adjusting valve handle 10 can be converted into the reciprocating action up and down for the link gear of the valve handle through the function of the trapezoid thread, thus, the link gear of the valve handle can drive the thimble of the thermo sensitive element 11; consequently, the heat sensitivity of the thermo sensitive element 11 can be regulated, and the temperature can be preset.

The principle of the flow switch of the successive type constant-temperature valve core with single handle provided by the embodiment is as follows: when turning the temperature adjusting valve handle 10 to a certain angle from the closed position, the water outlet can be started, and during the process of further turning the temperature adjusting valve handle 10, the temperature can be adjusted (from low to high), but the process basically does not influence the flow rate (because when the water outlet is opened to a certain degree, the outlet water quantity is the total inlet water quantity). When closing, reversely returning the temperature adjusting valve handle 10 can realize temperature adjusting (from high to low), and after reaching the certain angle, reversely turn into a small angle, consequently, water outlet can be closed.

The embodiment is only fully for disclosure, but does not restricts the invention, so all those obvious immaterial alterations or improvements made by the technicians in the technical field after enlightening by the invention belong to the range disclosed by the invention.

The invention claimed is:

1. A successive type constant temperature valve core with single handle comprises a valve cover, a temperature adjusting assembly, a thermo sensitive element and a control assembly for hot and cold inlet water, combining in the chamber of the valve cover from top to bottom, wherein the control assembly for hot and cold water inlet comprises a holder of the thermo sensitive element, an adjuster, a put-off spring, a buffer spring and a holding piece, the upper part of the holder of the thermo sensitive element props the thermo sensitive element, and the lower part extends from the lower end of the valve cover; the buffer spring is arranged outside the holder of the thermo sensitive element, and the two ends respectively prop the holder of the thermo sensitive element and the adjuster; the adjuster is axial adjustably restricted to the periphery of the lower part of the holder of the thermo sensitive element by matching the buffer spring with the holding piece; the put-off spring is arranged outside the buffer spring, and the two ends are respectively prop the holder of the thermo sensitive element and the valve cover; the top and foot of the adjuster respectively forms cold water inlet and hot water inlet; water outlet is arranged on the wall of the valve cover; the holder of the thermo sensitive element is provided with a mixed water passage that communicates with the cold water inlet, the hot water inlet and the water outlet.

2. The successive type constant-temperature valve core with single handle according to claim 1, wherein a flow switch is arranged at the place of the water outlet; a sealing member is arranged at the bottom of the temperature adjusting assembly, which can switch off the water outlet by downward closely matching with the flow switch.

3. The successive type constant-temperature valve core with single handle according to claim 2, wherein the sealing member is a seal ring.

4. The successive type constant-temperature valve core with single handle according to claim 2, wherein a mixed water inlet is arranged at the foot of the thermo sensitive element holder; a cold water passage is vertically provided on the adjuster, and the lower end of the cold water passage is communicated with the hot water inlet and the mixed water inlet.

5. The successive type constant-temperature valve core with single handle according to claim 2, wherein the valve cover comprises a temperature adjusting valve cover, a water outlet valve and a spring cover, all of which are combined from top to bottom, and the water inlet is arranged on the water outlet valve cover.

6. The successive type constant-temperature valve core with single handle according to claim 5, wherein the upper part of the thermo sensitive element holder and the spring cover are sealed, and can be matched by relatively sliding.

7. The successive type constant-temperature valve core with single handle according to claim 2, wherein the temperature adjusting assembly comprises a temperature adjusting valve handle and a link gear of the valve handle; the upper part of the temperature adjusting valve handle protrudes from the top of the temperature adjusting valve cover; the link gear of the valve handle matches with the lower part of the temperature adjusting valve handle, which can be reciprocating up and down driven by the temperature adjusting valve handle.

8. The successive type constant-temperature valve core with single handle according to claim 7, wherein the link gear of the valve handle comprises a tip and a tip seat; the tip seat matches with the temperature adjusting valve handle through screw threads; the tip is arranged in the lower part, and the tip props and matches with the thimble on the top of the thermo sensitive element.

9. The successive type constant-temperature valve core with single handle according to claim 1, wherein a mixed water inlet is arranged at the foot of the thermo sensitive element holder; a cold water passage is vertically provided on the adjuster, and the lower end of the cold water passage is communicated with the hot water inlet and the mixed water inlet.

10. The successive type constant-temperature valve core with single handle according to claim 1, wherein the valve cover comprises a temperature adjusting valve cover, a water outlet valve and a spring cover, all of which are combined from top to bottom, and the water inlet is arranged on the water outlet valve cover.

11. The successive type constant-temperature valve core with single handle according to claim 10, wherein the valve cover comprises a temperature adjusting valve cover, a water outlet valve and a spring cover, all of which are combined from top to bottom, and the water inlet is arranged on the water outlet valve cover.

12. The successive type constant-temperature valve core with single handle according to claim 11, wherein the upper part of the thermo sensitive element holder and the spring cover are sealed, and can be matched by relatively sliding.

13. The successive type constant-temperature valve core with single handle according to claim 1, wherein the temperature adjusting assembly comprises a temperature adjusting valve handle and a link gear of the valve handle; the upper part of the temperature adjusting valve handle protrudes from the top of the temperature adjusting valve cover; the link gear of the valve handle matches with the lower part of the temperature adjusting valve handle, which can be reciprocating up and down driven by the temperature adjusting valve handle.

14. The successive type constant-temperature valve core with single handle according to claim 13, wherein the link gear of the valve handle comprises a tip and a tip seat; the tip seat matches with the temperature adjusting valve handle through screw threads; the tip is arranged in the lower part, and the tip props and matches with the thimble on the top of the thermo sensitive element.

* * * * *